(No Model.)
E. E. WARD.
LID HOLDER FOR PANS OR VESSELS.
No. 483,408. Patented Sept. 27, 1892.
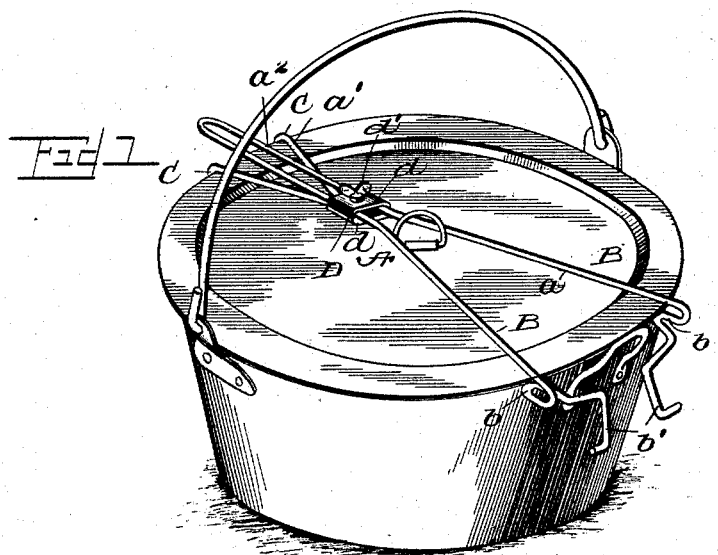
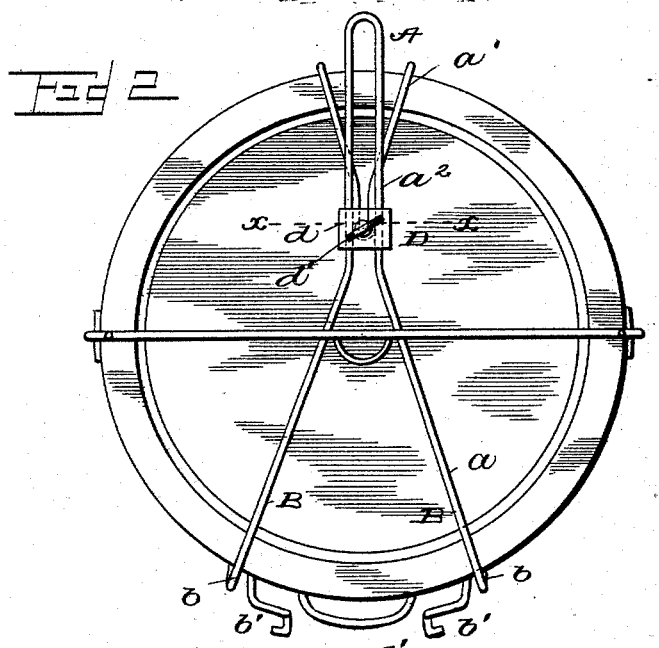
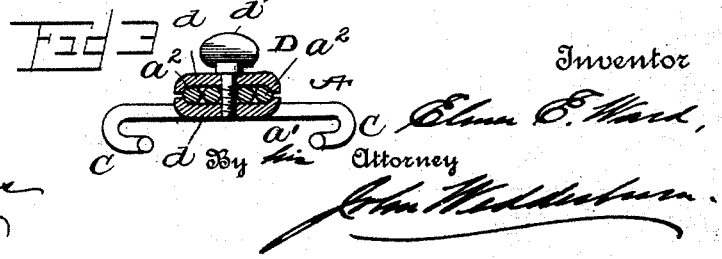
Witnesses
Inventor

UNITED STATES PATENT OFFICE.

ELMER E. WARD, OF COLORADO SPRINGS, COLORADO.

LID-HOLDER FOR PANS OR VESSELS.

SPECIFICATION forming part of Letters Patent No. 483,408, dated September 27, 1892.

Application filed February 17, 1892. Serial No. 421,878. (No model.)

*To all whom it may concern:*

Be it known that I, ELMER E. WARD, of Colorado Springs, in the county of El Paso and State of Colorado, have invented certain new and useful Improvements in Lid-Holders for Pans or Vessels; and I do hereby declare the following to be a full, clear, and exact description of the invention, such as will enable others skilled in the art to which it appertains to make and use the same.

This invention relates to a lid-holder for cooking pans or vessels, and has for its object the production of a cheap, simple, and highly-efficient device for securely retaining the lid or cover of a pan or vessel in place while the liquid contents are being drained.

The invention consists in a holder having two forward hooks for grasping the bead and edge of a pan or vessel and cover therefor and two hooked spring-arms which when drawn together or toward each other will likewise engage said bead and edge and firmly hold the lid or cover in place while draining the liquid contents of such pan or vessel.

The invention further comprises the peculiar construction and arrangement of parts, substantially as hereinafter fully set forth, and particularly pointed out in the claims.

In the accompanying drawings, Figure 1 is a view in perspective of a cooking-vessel with my improved lid-holder. Fig. 2 is a plan view of the latter. Fig. 3 is a cross-sectional view on the line $x\ x$, Fig. 2.

Referring to the drawings, A designates my improved lid-holder as an entirety, and the same is composed of two parts or members $a\ a'$. The part or member $a$ is preferably made from one piece of strong wire, which is bent at its center and formed into two parallel guide-rods $a^2$. From the inner ends of these guide-rods extend divergent spring-arms B, which are bent to form hooks $b$, designed to fit over and beneath the edge and bead of a vessel and its cover. From these hooks the wires are bent at angles to form two finger pulls or handles $b'$, designed to be grasped by the operator when it is desired to draw the hooks $b$ toward each other. The other part or member $a'$ is likewise composed of a single wire rod bent at its ends to form hooks C to engage the bead of the vessel. The inner end of this part or member $a'$ is held by a clamp D, which consists of two corresponding plates $d$, which fit over the parallel rods $a^2$ of part or member $a$ and are firmly bound by a central set-screw $d'$. The divergent arms of member $a'$ are bent so as to extend beneath the guide-rods of member $a$. By means of clamp D the member $a'$ can be adjusted to and held at any point, according to the width of the pan or vessel to which the holder is to be applied.

The application of my lid-holder is shown in Fig. 1. The member $a'$ is first adjusted so that the hooked ends of the arms thereof and the hooked ends of the spring-arms of member $a$ will be at opposite sides of the pan or vessel. When the arms of member $a'$ are adjusted so as to be in engagement with the bead of the vessel, the operator grasps the finger-pulls of the spring-arms of member $a$ and, drawing the same together, causes the hooked portions thereof to firmly bind or engage the bead of the vessel and edge of cover at points diametrically opposite the hooked ends of arms of member $a'$. Hence by this means the lid or cover is firmly and securely held, and the operator can drain off the liquid contents of the pan or vessel without allowing the lid or cover to fall, resulting in the escape of the contents of the vessel, as now often occurs. The advantage of a lid-holder of this kind is therefore apparent, and it will be observed that the device herein described is extremely simple and inexpensive and that no nicety of adjustment is necessary to render the holder applicable, since the drawing together of the divergent spring-arms completes the securing of the lid or cover.

I claim as my invention—

1. A lid-holder for pans or vessels, having two forward hooks for engaging the bead and edge of a vessel and cover therefor and two rearward divergent spring-arms having hooks, as set forth.

2. The herein-described lid-holder, composed of two parts or members, one of which has divergent spring-arms provided with hooked portions and the other is adjustably secured to the former, and also provided with hooked portions, as set forth.

3. The herein-described lid-holder, composed of two parts or members, one of which has divergent spring-arms provided with hooked portions and finger-pulls and the other is adjustably secured to the former, and also provided with hooked portions, as set forth.

4. The herein-described lid-holder, consisting of the part or member $a$, formed from one continuous wire rod bent to form guide-rods, divergent spring-arms extending therefrom and provided with hooked portions near their outer ends, and also with finger-pulls, and the part or member $a'$, formed from one continuous wire rod and having outer hooked ends, and the two-part clamp fitting said guide-rods and holding said part or member $a'$, substantially as set forth.

In testimony whereof I have signed this specification in the presence of two subscribing witnesses.

ELMER E. WARD.

Witnesses:
GEORGE M. WARD,
JASON WARD.